G. W. HODDY ET AL 3,063,761

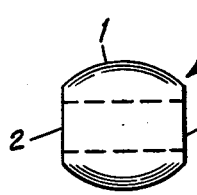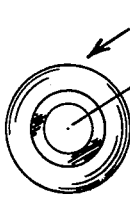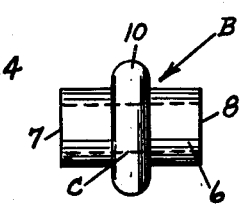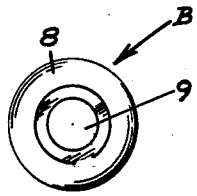
FIG. 1  FIG. 2  FIG. 3  FIG. 4
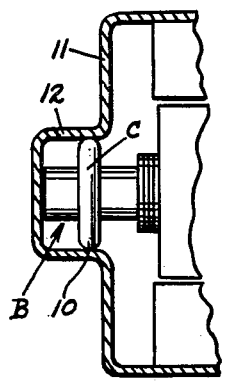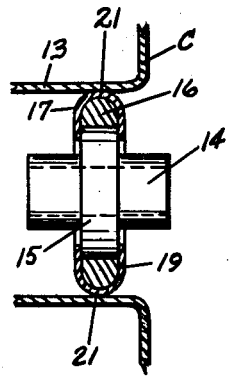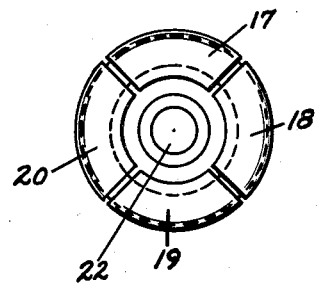
FIG. 5  FIG. 6  FIG. 7
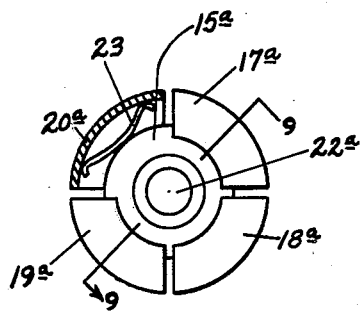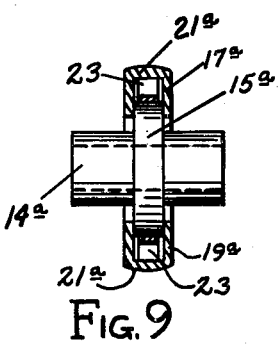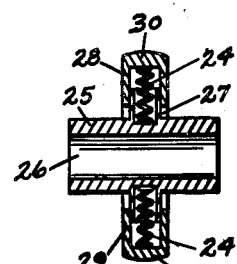
FIG. 8  FIG. 9  FIG. 10
INVENTORS
GEORGE W. HODDY & GERALD L. HODDY &
BY RAYMOND A. HODDY
ATTORNEY Nov. 13, 1962

BEARING STRUCTURE

Filed Aug. 7, 1958

INVENTORS
GEORGE W. HODDY & GERALD L. HODDY &
BY RAYMOND A. HODDY

ATTORNEY

Nov. 13, 1962  G. W. HODDY ET AL  3,063,761
BEARING STRUCTURE
Filed Aug. 7, 1958  5 Sheets-Sheet 3

INVENTORS
GEORGE W. HODDY & GERALD L. HODDY &
BY RAYMOND A. HODDY

ATTORNEY

Nov. 13, 1962    G. W. HODDY ET AL    3,063,761
BEARING STRUCTURE

Filed Aug. 7, 1958    5 Sheets-Sheet 4

INVENTORS
GEORGE W. HODDY & GERALD L. HODDY &
BY   RAYMOND A. HODDY

ATTORNEY

United States Patent Office 3,063,761
Patented Nov. 13, 1962

3,063,761
BEARING STRUCTURE
George W. Hoddy, Gerald L. Hoddy, and Raymond A. Hoddy, Owosso, Mich., assignors to Universal Electric Company, Owosso, Mich., a corporation of Michigan
Filed Aug. 7, 1958, Ser. No. 753,695
10 Claims. (Cl. 308—72)

This invention relates to improved bearing structures and pertains more specifically to a self-aligning bearing for a rotatable and power driven shaft and by reason of the bearing being self-aligning cocking or binding of the shaft is prevented, which is of course highly desirable and beneficial.

The bearing is suitable for use in connection with a rotatable shaft irrespective of the device with which the shaft is associated and therefore the bearing is susceptible of wide uses which are too numerous to enumerate. In the drawings the bearing is illustrated as being associated with an electric motor and is so described, but this is not to be understood as limiting the bearing to such a use.

Self-aligning bearings for shafts are not new but the present bearing has decided and wide advantages over such bearings as heretofore made, known and used. Heretofore it has been common practice to provide self-aligning bearings with a spherical shaped nose which are rotatably supported in a support or seat, but with such bearings it was necessary to provide pressure longitudinally of the bearing and the shaft which is rotatable therein to retain the bearing on or in its seat. The pressure has been ordinarily provided through the medium of resilient means. Such bearings have been found to be unsatisfactory as well as costly to make and assemble. Such bearings, for instance, when subjected to heavy or vibrating loads pull out of or move in their seats and thereby cause noisy operation or damage. Additionally when only a small amount of power is transmitted to the shaft these bearings will not freely align due to the pressure utilized to hold the bearings on their seats and the shaft binds and is prevented from rotating.

An advantage of the present bearing is that it requires no force to retain it in position on or in its seat and this attribute is due to the fact that its support or seat is directly vertically beneath the self-aligning spherical or curved portion or section of the bearing, that is to say, perpendicular to the shaft. As a result of this there is provided a freely self-aligning bearing and a support which do not require pressure between them to maintain them in proper operating position and a bearing which cannot be removed from its support or seat by load on the shaft.

In one of its forms the bearing has the advantage of embodying a resilient section or sections for shock absorption and these are expansible to maintain the self-aligning portion of the bearing in contact with its support or seat. This expansible feature of the bearing eliminates clearance between the bearing and its support or seat and additionally compensates for any dimensional variation which might exist between the bearing and its support or seat in that the bearing will be inherently, automatically or manually adjustable to provide variable outside spherical diameters.

While the present improved bearing inherently aligns itself prior bearings inherently mis-align themselves with the shaft. Prior bearings are supported at one end in the bearing support and the center of gravity of the shaft load on the bearing is located at the longitudinal center of the bearing. This arrangement produces a leverage in the bearing which causes the bearing to swivel in its seat and thereby tighten the shaft which causes undesirable results.

In another of its forms the bearing has the advantage of having in combination with it a self-aligning plate or plates for taking up the axial thrust and these compensate for any surfaces at either end of the bearing which are out of perpendicular with the shaft.

In still another form of the invention the bearing has the desirable attribute of being self-lubricating.

The bearings has many other desirable attributes such as the following. It is rugged; it is useable with either reciprocating, rotating, oscillating or stationary shafts, and in all instances it is positively free to align itself and will therefore not bind the shaft; it will not break down oil film because the shaft will not cock and as a consequence prevent uneven wear of the shaft or the bearing; it provides the minimum of rotating friction to the shaft, and most importantly provides for more quiet operation than do bearings as heretofore known and used.

For best results the bearings or their supports or both should have spherical diameters but this may be departed from and yet attain desirable results, that is, the bearing or its support rather than being truly spherical need only be curved or rounded.

Other advantages will be apparent and understood from the following description.

In another of its forms the bearing has the advantage of having in combination with it a self-aligning plate or plates for taking up the axial thrust and these compensate for any surfaces at either end of the bearing which are out of perpendicular with the shaft.

In still another form of the invention the bearing has the desirable attribute of being self-lubricating.

The bearing has many other desirable attributes such as the following. It is rugged; it is useable with either reciprocating, rotating, oscillating or stationary shafts, and in all instances it is positively free to align itself and will therefore not bind the shaft; it will not break down oil film because the shaft will not cock and as a consequence prevents uneven wear of the shaft or the bearing, it provides the minimum of rotating friction to the shaft, and most importantly provides for more quiet operation than do bearings as heretofore known and used.

For the best of top results the bearings or their supports or both should have spherical diameters but this may be departed from and yet attain desirable results, that is, the bearing or its support rather than being truly spherical need only be curved or rounded.

Other advantages than those specifically set forth will be apparent and understood by those skilled and familiar with the art from the following description when read in the light of the accompanying drawings.

In the drawings:

FIG. 1 is a view in side elevation illustrating a bearing suitable for use in practicing the invention.

FIG. 2 is an end view of FIG. 1.

FIG. 3 is a view in side elevation of a modified form of bearing embodying the inventive concept.

FIG. 4 is an end view of FIG. 3.

FIG. 5 is a view in side elevation, partly in vertical section, illustrating the bearing of FIG. 3 in combination with an electric motor.

FIG. 6 is a view in side elevation partly in vertical section illustrating a modified form of the bearing illustrated in FIG. 3.

FIG. 7 is an end view of the bearing of FIG. 6.

FIG. 8 is an end view with a part thereof in vertical section illustrating a further modified form of bearing.

FIG. 9 is a view in side elevation of the bearing of FIG. 8 with a portion of the view in vertical section.

FIG. 10 is a longitudinal vertical sectional view of a still further modified form of bearing.

Figure 11:
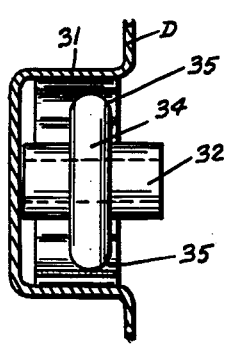
FIG. 11 is a view in side elevation and partly in vertical section illustrating another and further form of bearing.

The inventive concept can be embodied in varying constructions, as will be apparent from the drawings, and describing first the construction appearing in FIGS. 1 and 2, the bearing comprises an element A having a spherical or rounded outer surface 1 and square ends 2 and 3 and provided centrally with a longitudinal bore 4 for the reception of a shaft. This bearing becomes self-aligning when used in combination with a seat or support and this seat or support can be of varied construction. As an example, the bearing A is illustrated as supported in one type of seat in FIG. 16 wherein the seat is illustrated as being spherical as at 5 to permit the bearing to rock therein so that the bearing is self-aligning to accommodate itself to the shaft 6. In this form of seat or support the engagement between the spherical surface 1 of the bearing and the seat is not throughout the spherical surface of the bearing but the contact could be throughout the spherical surface of the bearing inasmuch as this bearing could be used in either of the seats illustrated in FIGS. 14 and 15. As another instance of it being unnecessary for the bearing to have its entire spherical surface in contact with its support or seat, this bearing could be utilized in the support or seat illustrated in either FIG. 6 or 13 of the drawings. Irrespective of the exact form of seat the bearing, due to its spherical outer surface, will rock or can rock to accommodate itself to the shaft to prevent either binding the bearing or cocking of the shaft.

A modified form of the invention appears in FIGS. 3 and 4 wherein the bearing as an entirety is designated B and it comprises a tubular sleeve 6 having straight or perpendicular ends 7 and 8 and provided centrally with a longitudinal bore 9 for the reception of a shaft. Intermediate its length the sleeve is provided with a self-aligning portion of the bearing which is designated C and has a rounded or curved outer face or perimeter 10. The manner of utilizing this bearing in combination with an electric motor is illustrated in FIG. 5 of the drawings wherein 11 is one end of the motor case or casing and is shaped to form a tubular bearing support or seat 12 which like the self-aligning portion C of the bearing is circular in configuration. Here it will be seen that the rounded surface 10 of the self-aligning portion of the bearing engages the bearing seat or support and can rock therein to accommodate itself to the shaft which, although not illustrated, extends through the sleeve bore or passageway 9. This bearing will remain in its seat or support and the support for the self-aligning portion of the bearing is vertically beneath that portion of the bearing, that is to say, perpendicular to the shaft. Power load on the bearing will not cause the bearing to move from its seat or support.

The bearings illustrated in FIGS. 3 to 5 inclusive can be modified in the manners shown in FIGS. 6 to 15 inclusive and when so modified embodies the principle of an adjustable or variable spherical diameter, hereinbefore referred to, which cause the bearing to compensate for any dimensional variation which might exist between the bearing and its support or seat, that is to say, eliminates any clearance between the bearing and its support or seat.

Having reference to FIGS. 6 and 7, C is one end of a motor case or casing having therein a circular bearing seat or support 13. The bearing comprises a sleeve 14 provided intermediate its ends with a circular shaped enlargement 15 carrying on its outer face a ring 16 of resilient material which might be rubber, neoprene or any other suitable like material. This ring is provided with a series of caps 17, 18, 19 and 20 each of which has its outer face or perimeter curved as at 21. Centrally the bearing sleeve is provided with a longitudinal bore 22 for the reception of a shaft. In operation the curved or spherical surfaces of the caps are held in resilient engagement with the interior surface of the bearing support or sleeve. The bearing will operate as does the bearing illustrated in FIGS. 3 to 5 inclusive, but due to the plurality of caps and the resilient element beneath them, the spherical diameter of the self-aligning portion of the bearing is variable as to diameter and the bearing accordingly will compensate itself for any dimensional variation between it and its seat or support.

The bearing of FIGS. 8 and 9 is a constructional variation of that bearing in FIGS. 6 and 7. In this instance the enlarged portion 15a of the bearing has in combination with it the plurality of caps 17a, 18a, 19a and 20a but the neoprene or resilient ring is replaced by a plurality of leaf-like springs one each of which is below a cap. One of said springs 23 appears in FIG. 8 and bears against the under side of the cap 20a and against the outer face or perimeter of the bearing portion 15a This bearing has a sleeve portion 14a provided with a longitudinal bore 22a for the reception of a shaft. All of the caps have their outer faces or perimeters rounded as at 21a.

FIG. 10 is a modification of the construction shown in FIGS. 8 and 9 wherein a plurality of coil springs 24 are substituted for the flat or leaf-like springs 23. Again the bearing has a sleeve 25 with a shaft reception bore 26. Intermediate its length the sleeve is provided with a circular enlargement 27 on which the caps 28 and 29 as well as two other caps, not shown, are reciprocable. These caps have a rounded, curved or spherical shaped outer surface or perimeter 30 for engagement with the particular seat or support with which the bearing is associated.

Figure 12:
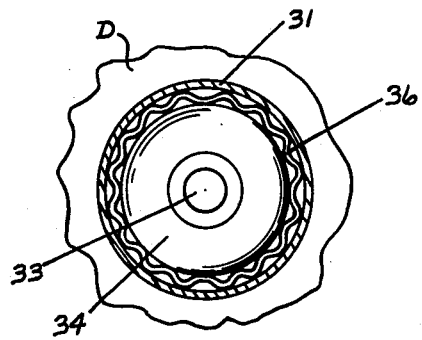
FIG. 12 is an end view of the bearing of FIG. 11.

The bearing illustrated in FIGS. 11 and 12 is a further construction utilizing the resilient principle, hereinbefore described, of engagement between the self-aligning portion of the bearing and the bearing seat or support. The bearing seat or support is like that illustrated in FIG. 5 wherein the motor case end D is provided with a circular bearing support or seat 31. The bearing embodies a sleeve 32 having a bore 33 for the reception of the shaft.

Intermediate its length the sleeve is provided with a circular shaped enlargement 34 constituting the self-aligning portion of the bearing and the outer face or perimeter of this is curved as at 35. Intermediate the curved surface 35 and the bearing seat or support a thin corrugated spring steel strip 36 is interposed. The outer face of this strip engages the bearing seat while the inner face of the strip engages the rounded surface 35.

Figure 13:
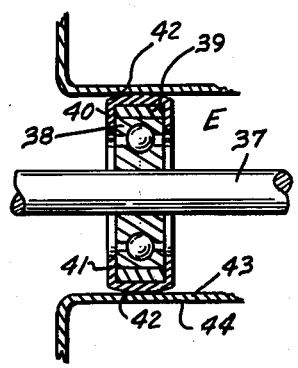
FIG. 13 is a longitudinal vertical sectional view through another form of bearing construction.

The principle embodied in the bearings thus far described can be utilized in combination with an anti-friction bearing and such a bearing is illustrated in FIG. 13. Here generally the type bearing illustrated in FIGS. 6 and 7 is illustrated but the elongated sleeve heretofore utilized is eliminated. The shaft 37 passes through a ball roller bearing designated as an entirety by E. The outer ring 38 of this bearing is encircled by a resilient ring 39 which is covered by a plurality of caps, preferably four although only two are illustrated, 40 and 41 the outer surfaces or perimeters of which are curved or spherical as at 42 for engagement with the inner surface 43 of the bearing seat or support 44. Thus it will be seen that the inventive concept can be utilized with anti-friction type bearing.

Figure 14:
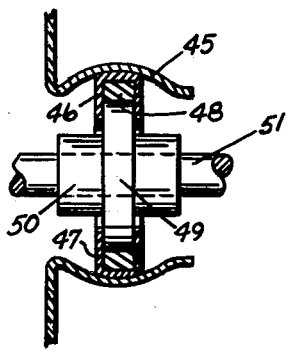
FIG. 14 is a view in side elevation and partly in longitudinal section through a bearing, quite similar to the bearing of FIG. 6, supported in a modified form of seat.

FIG. 14 illustrates a bearing of the form illustrated in FIG. 6 in a spherical type or form of seat or support 45. In this form of bearing the curved spherical shaped outer surfaces or perimeters of the caps 46 and 47 engage the spherical shaped interior surfaces of the bearing seat and are held in engagement therewith by a resilient ring 48 which encircles the enlarged portion 49 of the bearing sleeve 50 in which the shaft 51 is rotatably supported.

Figure 15:
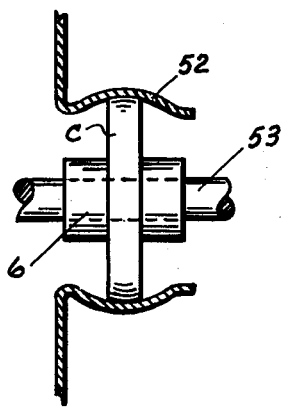
FIG. 15 is a view in side elevation of a bearing similar to the bearing of FIG. 3 in a modified form of seat which is shown in vertical section.
Figure 16:
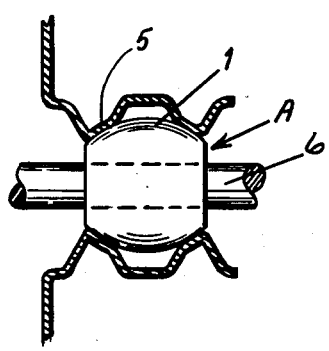
FIG. 16 is a view in side elevation of a bearing similar to the bearing of FIG. 1 illustrated in a modified form of seat which is illustrated in vertical section.

FIG. 15 illustrates the bearing of FIG. 3 in combination with a spherical shaped bearing seat or support 52. It will be seen that the outer curved or spherical shaped perimeter of the portion C of the bearing engages the like or complementary shaped portion of the seat. This arrangement permits easy self-aligning of the bearing in respect to the shaft 53.

Figure 18:
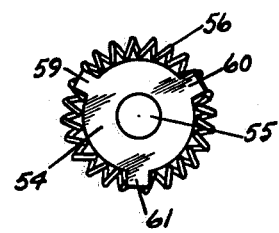
FIG. 18 is an end view of the bearing of FIG. 17.
Figure 17:
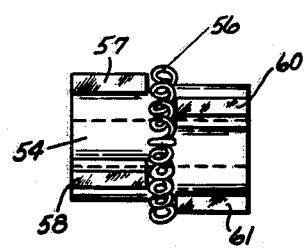
FIG. 17 is a view in side elevation of a still further form of bearing.

The construction appearing in FIGS. 17 and 18 is another which provides for resiliency in the self-centering portion of the bearing so as to assure contact between the bearings and all parts of the circumference of its seat or support. The bearing comprises a sleeve 54 provided with a longitudinal bore 55 for reception of the shaft. Intermediate its length the sleeve is encircled by a coil spring 56 which will engage the seat or support for the bearing. The bearing can rock or oscillate upon this spring so as to accommodate itself to the shaft and the spring will assure contact with the bearing seat or support throughout the circumference thereof. At each side of the spring the sleeve is exteriorly provided with a plurality of ribs 57, 58, 59, 60 and 61. Three ribs are provided at each side of the spring but more or less can of course be provided as desired or found necessary. These ribs hold or retain the spring against longitudinal movement of the sleeve.

Figure 19:
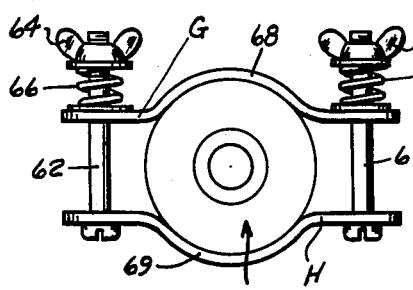
FIG. 19 is an end view of a still further form of bearing seat.
Figure 21:
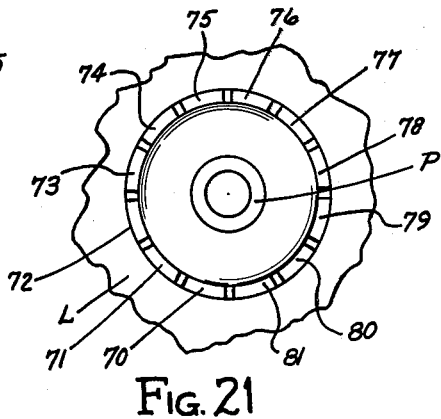
FIG. 21 is an end view of FIG. 20.
Figure 20:
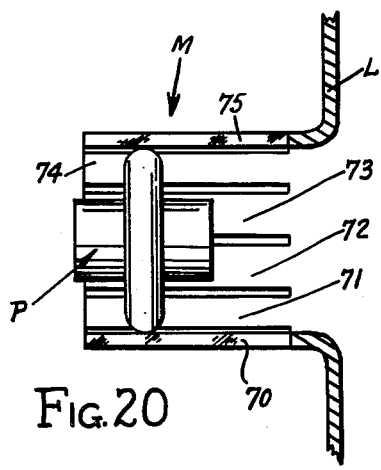
FIG. 20 is a view in side elevation partly in vertical section illustrating a still further form of bearing seat.
Figure 22:
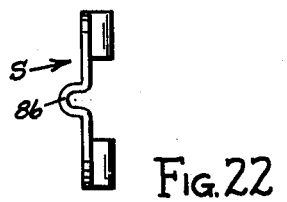
FIG. 22 is a view in side elevation of a washer for use with a bearing.
Figure 23:
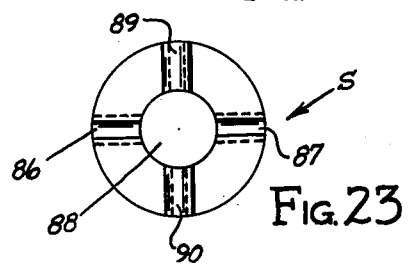
FIG. 23 is a top plan view of FIG. 22.

From the description thus far given it will be seen and understood that the bearing can be used in combination with seats of varying construction. FIGS. 19 to 21 illustrate two additional bearing support or seat constructions.

The structure of FIG. 19 is a two-part resilient support and comprises a pair of strap-like elements G and H the outer ends of which are connected by bolts 62 and 63 each of which is provided with a wing-nut 64 and 65 for tightening down upon its respective coil spring 66 or 67 which encircle the extending ends of the bolts. The bearing, designated as an entirety by K, can be of any of several constructions described and is supported between the straps or saddles. Intermediate their lengths each strap is provided with a curved or spherical shaped portion as at 68 and 69 for the reception of the bearing.

In the bearing support structure illustrated in FIGS. 20 and 21, L designates the support generally and this might well, but not necessarily, be one end of a motor case or casing. A plurality of spring fingers 70 to 81 inclusive extend outwardly from the member or case L to provide a circular tubular seat or support designated generally as M. A bearing P is illustrated as supported in or on the seat and this bearing can be of any of the types hereinbefore described but is illustrated as being of that type appearing in FIGS. 3 to 5 inclusive of the drawings.

Figure 24:
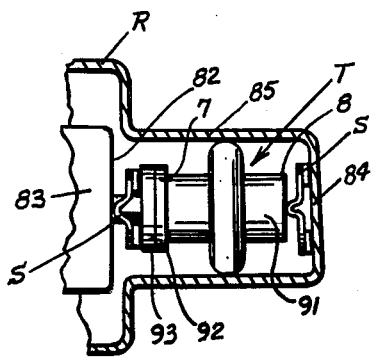
FIG. 24 is a view in side elevation and partly in vertical section illustrating the use of the washer of FIGS. 22 and 23 in combination with a bearing.

In the manufacture and fabrication of a device, such as a motor for instance, it is not uncommon or rare for those portions which lie in a vertical plane to be out of true or out of alignment with one another. As an instance and using the construction appearing in FIG. 5 as an example and describing FIG. 24 specifically, the end face 82 of the motor part 83 can be and often is out of parallel with the cap or end 84 of the bearing seat or support 85 of the motor case end R. In other words, the parts 82 and 84 are out of parallel with the bearing ends 7 and 8 of FIG. 24. Any pressure between these ends and the surfaces of 82 and 84 would cause the bearing to cock and cause binding of the shaft. The present improvement provides a novel and improved means of taking up end thrust against such out-of-square surfaces to prevent cocking of the bearing and tightening of the bearing on the shaft which is supported in the bearing.

The construction for accomplishing this highly desirable result comprises the use of identical thrust washers each of which is designated S. This washer is shaped to provide on one of its faces a pair of outwardly extending rounded ribs 86, and 87. These ribs extend in aligned relationship radially from a central opening 88 through which the shaft passes. The washer on its opposite face is provided with a similar pair of ribs 89 and 90 but in this instance the ribs extend at right angles to the first named ribs 86 and 87. Assuming that the surfaces 82 and 84 are out of parallel, and having reference to FIG. 24, the bearing T is illustrated as being supported in the seat. One of the washers S is interposed between the seat cap 4 and the outer end of the bearing sleeve 91. Between the inner end of the bearing sleeve and the motor part 82 a pair of conventional washers 92 and 93 are positioned and between them and the motor and face 82 a second washer 3 is interposed. It will be seen and understood that due to the ribs on the washers the conventional washers 92 and 93 will be positioned and held parallel with the bearing end yet the bearing will not be cocked irrespective of the out-of-parallel relationship between the surfaces 82 and 84. It will be understood of course that whether any conventional washers are used or the number of conventional washers which may be used is determined by the spacing between the inner end of the bearing sleeve and the motor part 82. If no conventional washers are used the washer S would bear directly against the inner end of the bearing sleeve as does the washer S at the outer end of the bearing sleeve.

Figure 25:
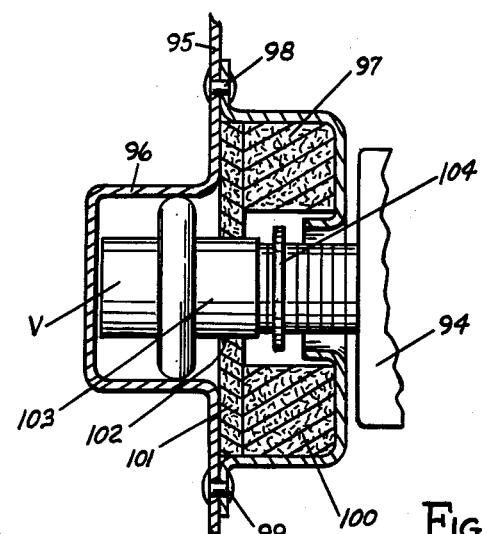
FIG. 25 is a view in side elevation of a bearing, a portion of the view being in vertical section and illustrating the lubricating means therefor.

A self-lubricating bearing is illustrated in FIG. 25. Here a motor 94 is housed within a casing, a portion of one end of which is illustrated and comprises an end plate 95 having formed therein a seat or support 96 for a bearing V which supports the extending shaft, not shown, of the motor. A housing 97 is suitably secured as at 98, 99 to the inner face of the casing plate 5 and constitutes an oil reservoir and carries therein a felt or like washer 100. This washer is out of engagement with any rotating parts of the motor, shaft, or bearing. A second and larger felt washer 101 having capillary contact with the felt 100 has a central opening the edges or perimeter 102 of which is in engagement with the sleeve 103 of the bearing. The shaft is provided with an oil slinger 104. In operation oil is being constantly returned to the felt 100 by the slinger and accordingly this felt serves as a reservoir and the construction provides a self-lubricating bearing.

Figure 26:
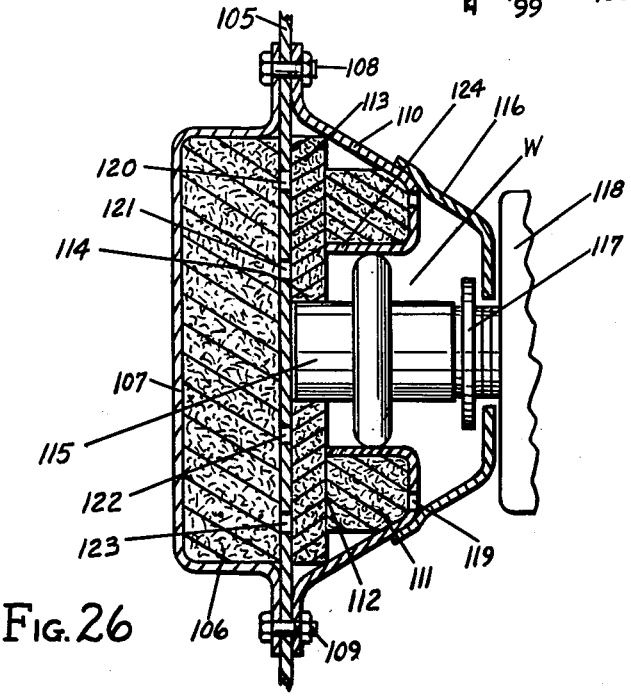
FIG. 26 is a view in side elevation of a bearing, a portion of the view being in vertical section and illustrating a modified form of lubricating means therefor.

A modified form of self-lubricating bearing is illustrated in FIG. 26 wherein the oil reservoir is on the external face of the motor casing plate 105. The reservoir is a felt or like element 106 contained within the housing or chamber formed by the plate 107 which is secured as at 108 and 109 to the plate 105. A plate 110 is secured to the inner face of the main plate 105 and contains a felt washer 111 having capillary contact as at 112 with a washer 113 which has lubricating engagement as at 114 with the sleeve 115 of the bearing W. The plate 110 carries an extension plate or shield 116 within which rotates the slinger 117 carried by the shaft of the motor rotor 118. Oil reaching the slinger will pass to the felt 111 through a plurality of openings 119 in the plate 110. Oil contained in the reservoir felt 106 reaches the lubricating felt 113 through a plurality of passageways such as 120, 121, 122 and 123 provided in the main motor casing plate 105. The plate 110 forms a seat or support 124 for the bearing W and this bearing of course can be of any of the forms hereinbefore described.

Figure 27:
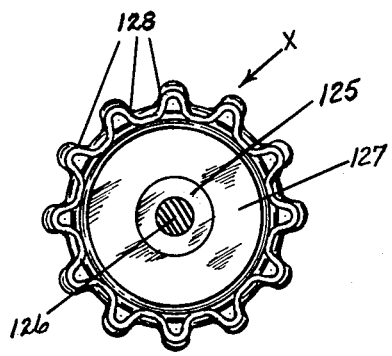
FIG. 27 is an end of a modified form of bearing.
Figure 28:
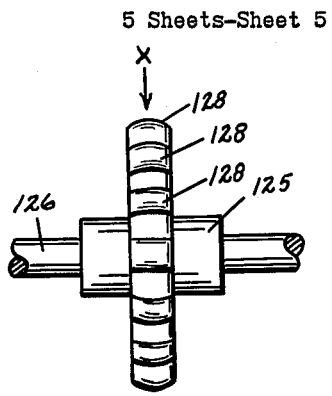
FIG. 28 is a view in side elevation of the bearing of FIG. 27.

A further form of bearing is illustrated in FIGS. 27 and 28 wherein the construction illustrated has in its broadest aspect some similarity to the bearing illustrated in FIGS. 5 to 14 inclusive. This bearing can be used with any of the supports illustrated in respect to the bearings heretofore described and comprises a sleeve 125 which rotatably supports the shaft 126. Intermediate its length the bearing is provided with a circular enlargement 127 the outer face of which is curved similarly to the curvature 10 of the enlarged circular portion of the bearing illustrated in FIG. 3. A strip of spring steel designated as an entirety by X is repeated around the face of the circular enlargement 127. This strip is of a corrugated nature comprising a plurality of transversely extending protrusions 128. These protrusions in end view, as they appear in FIG. 27, have a spherical or curved surface and additionally each of the protrusions is curved throughout its length, that is to say, curved in a direction transverse the strip just as the perimeter of the enlargement 127 is curved transversely.

The protrusions have sufficient resiliency so that the bearing with the strip thereon will automatically adjust itself to any slight variations in size of the support, as for instance a support or seat of the nature of the support or seat 12 appearing in FIG. 5 of the drawings. It will be understood that there could be some variations in the size of the seat for support resulting from error in the manufacture thereof. Accordingly this bearing will resiliently adjust or accommodate itself to its seat or support and additionally the bearing is self-centering as the bearing will rock on the spherical or curved surfaces of the protrusions which are in engagement with the seat or support. This self-centering operation would be similar to that described in respect to the bearing appearing in FIG. 6 as well as other figures of the drawings.

Figure 29:
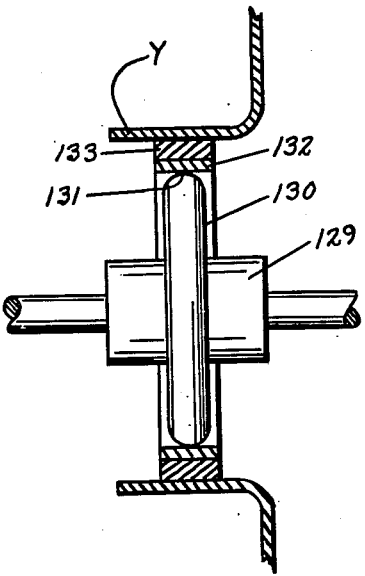
FIG. 29 is a view in side elevation partly in vertical section, illustrating a still further modified form of bearing.

FIG. 29 is a further modified form of bearing shown in combination with a bearing support or seat Y. Here the bearing comprises a sleeve 129 having intermediate its length a circular enlargement 130 the perimeter of which is spherical or curved as at 131. A flat metallic strip or band 132 encircles the perimeter of the circular enlargement 130. A resilient strip or band 133, which is also flat, encircles the band or strip 132. This construction provide the resiliency so that the bearing will accommodate itself to the interior diameter of the seat or support Y. The self-aligning attribute of the bearing is obtained through the spherical or curved face 131 of the enlargement 130 which face readily rocks on the under face of the strip 132 as will be readily apparent and understood from the construction illustrated in FIG. 29.

All of the bearings, if desired, may be composed of some suitable finely pulverized metal having the desired porosity so that the metal may readily absorb lubricant to provide a self-lubricating bearing. The inventive concept is not limited to the use of any particular material in the bearings. The bearings may be made in whole or in part of bronze, babbit or some other metal. The bearings may be made in part of a metal and in part of some other material such as nylon or plastic. Any material suitable to the particular use to which the bearing is to be put can be used and the material used will be dictated by the circumstances and the use to which the bearing is to be put.

What we claim is:

1. A self-aligning bearing structure for a shaft comprising a bearing member having a ring and a bore for the reception of a shaft, a support defining a supporting surface that circumscribes a cylinder having the bore as its center, a series of generally U-shaped caps encircling said ring with the legs of said caps engaging the sides of said ring to prevent the caps from moving axially, said caps being capable of moving inwardly and outwardly relative to said ring, the outer perimeter of said caps defined by the base of the caps being transversely curved so that the outer surfaces of the caps form a substantially spherical surface having a diameter substantially equal to the diameter of the cylinder circumscribed by said supporting surface, and resilient means interposed between the ring and the underside of said caps and yieldingly holding said caps in engagement with the supporting surface.

2. The combination set forth in claim 1 wherein said resilient means comprises a ring of resilient material interposed between the first-mentioned ring on said bearing member and the undersides of said caps.

3. The combination set forth in claim 1 wherein said resilient means comprises a leaf spring interposed between the first-mentioned ring on said bearing member and the undersides of said caps.

4. The combination set forth in claim 1 wherein the resilient means comprises a coil spring interposed between the first-mentioned ring on said bearing member and each cap.

5. A bearing construction as defined in claim 1 wherein the bearing member has an abutment at one end of the bearing, and a second abutment at the opposite end of the bearing member, a washer at each side of the bearing members, and said washers providing rocking abutment between the ends of the bearing member and said abutments.

6. A construction as defined in claim 1 wherein there is an abutment beyond each end of the bearing member, a washer at each end of the bearing member between the bearing member and the adjacent abutment, and said washers providing a rocking engagement between ends of the bearing member and the abutments to accommodate and compensate for any misalignment of said abutments should they be out-of-parallel with one another.

7. A self-aligning bearing structure for a shaft comprising a support providing a cylindrical supporting surface, a bearing having a ring and a bore for the reception of a shaft, a series of generally U-shaped caps encircling said ring with the legs of said caps engaging the sides of said ring to prevent the caps from moving axially, said caps being capable of moving inwardly and outwardly relative to said ring, the outer perimeter of said caps defined by the base of said caps being transversely curved so that the outer surfaces of said caps form a substantially spherical surface having a diameter substantially equal to the diameter of the cylindrical supporting surface, and resilient means interposed between the ring and the undersides of said caps and yieldingly holding said caps in engagement with said supporting surface.

8. The combination set forth in claim 7 wherein said resilient means comprises a ring of resilient material interposed between said caps and the first-mentioned ring of said bearing member.

9. A self-aligning bearing structure for a shaft comprising a bearing member having a bore for the reception of a shaft, a support providing a substantially cylindrical supporting surface, a bearing comprising an outer race and anti-friction means between said member and said bearing member, a series of generally U-shaped caps encircling said outer race and having the legs thereof engaging the outer race to prevent the caps from moving axially, said caps being capable of moving inwardly and outwardly relative to said outer race, the outer perimeters of said caps defined by the base of said caps being transversely curved so that the outer surfaces of said caps form a substantially spherical surface having a diameter substantially equal to the diameter of the cylindrical supporting surface, and resilient means interposed between the outer bearing race and the undersides of said caps and yieldingly holding said caps in engagement with said supporting surface.

10. The combination set forth in claim 9 wherein said resilient means comprises a ring of resilient material interposed between said caps and said outer race.

References Cited in the file of this patent

UNITED STATES PATENTS

| | | |
|---|---|---|
| 1,306,653 | Wingfield | June 10, 1919 |
| 1,377,545 | Barks | May 10, 1921 |
| 1,761,533 | Patch | June 3, 1930 |
| 1,767,371 | Kelso | June 24, 1930 |
| 2,352,958 | Lauer et al. | July 4, 1944 |
| 2,423,684 | Collito | July 8, 1947 |
| 2,460,063 | Cole | Jan. 25, 1949 |
| 2,606,795 | Hutton | Aug. 12, 1952 |
| 2,793,087 | Hayes | May 21, 1957 |

FOREIGN PATENTS

| | | |
|---|---|---|
| 65,482 | Denmark | Aug. 4, 1947 |